J. H. SCHLEGEL.
LAWN MOWER GRINDER.
APPLICATION FILED OCT. 11, 1913.
1,097,267.
Patented May 19, 1914.
2 SHEETS—SHEET 2.
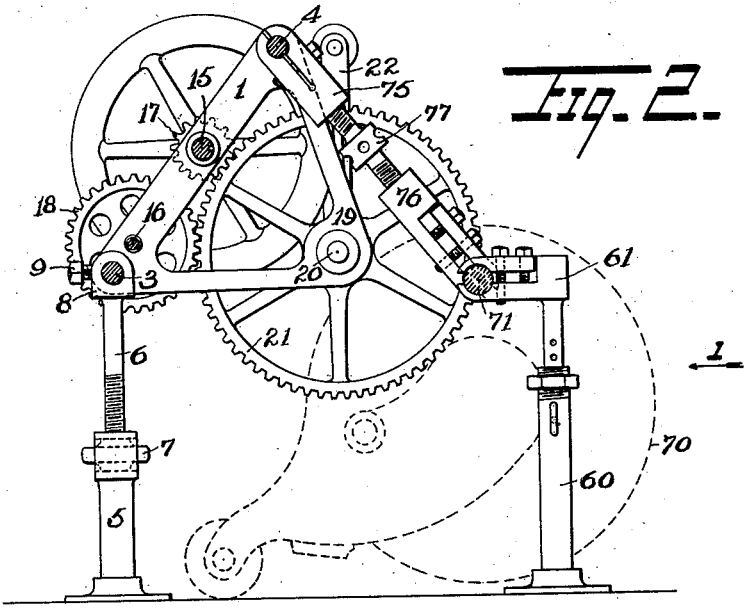
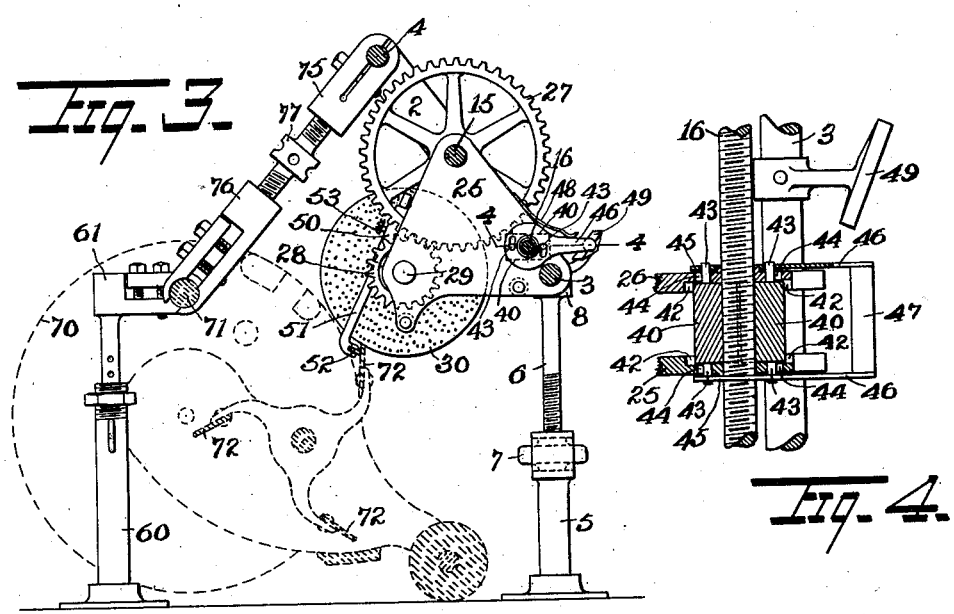
Witnesses
A. M. Kurtz
Caleb J. Dieber
Inventor
John H. Schlegel
By
D. M. Stewart
Attorney

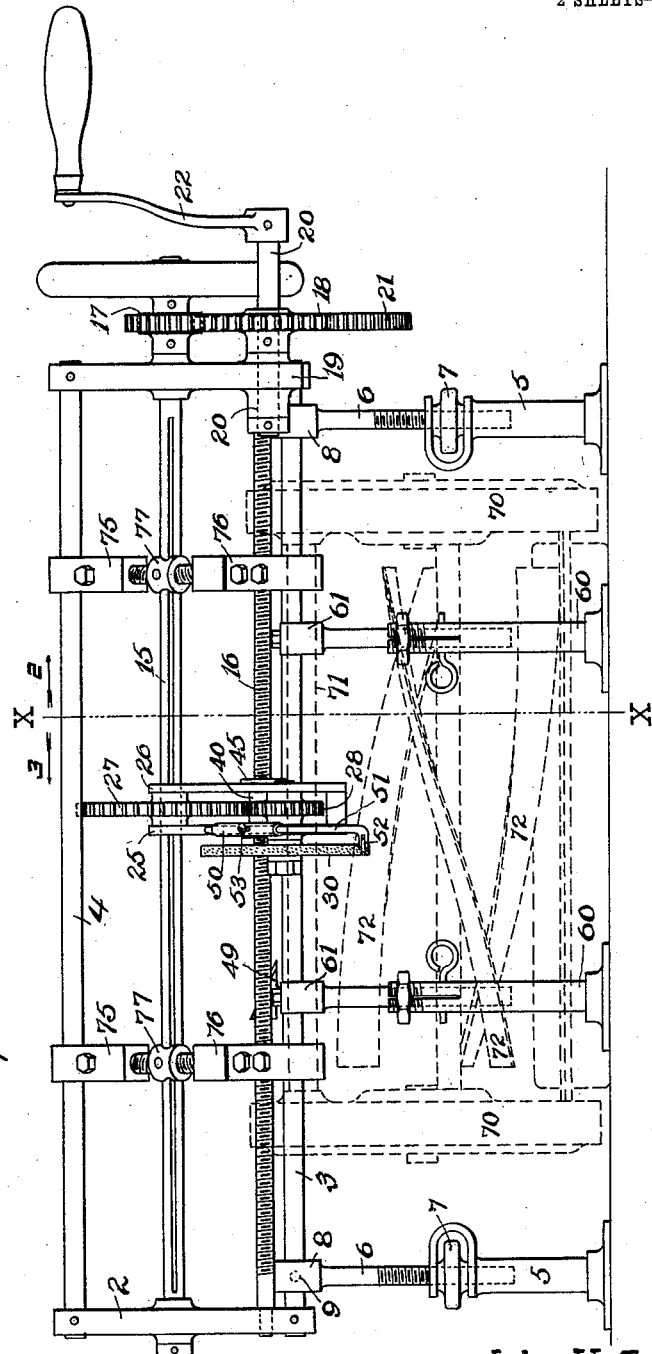

UNITED STATES PATENT OFFICE.

JOHN H. SCHLEGEL, OF MOUNT PENN, PENNSYLVANIA.

LAWN-MOWER GRINDER.

1,097,267.  Specification of Letters Patent.  Patented May 19, 1914.

Application filed October 11, 1913. Serial No. 794,560.

*To all whom it may concern:*

Be it known that I, JOHN H. SCHLEGEL, a citizen of the United States, residing at Mount Penn, in the county of Berks and State of Pennsylvania, have invented certain new and useful Improvements in Lawn-Mower Grinders, of which the following is a specification.

My invention relates to grinding machines, and particularly to that class adapted to sharpen the cutting blades of lawn mowers without removing them from the mower.

My main object is to provide a simple and advantageous construction in which the mower is held in fixed supports or standards and the grinding wheel, rotatably and reciprocatively mounted in an independently hinged frame arranged parallel with the mower, is swung into working relation with the cutting blades. Provision is also made for accurately adjusting the grinding wheel to grind each blade with the proper "clearance" and equally, to insure their best coöperation with the fixed straight knife of the mower. And improved means are also provided to keep each curved blade in contact with the reciprocating grinder wheel and to automatically limit said reciprocating movement at the end of each cutting stroke.

My invention is fully described in connection with the accompanying drawings, illustrating a preferred embodiment thereof, and the novel features are particularly set forth in the subjoined claims.

Figure 1 is a front elevation of a grinding machine embodying my invention, looking in the direction of arrow 1 of Fig. 2, a lawn mower being indicated in dotted lines as in position for grinding a cutting blade. Fig. 2 is a cross-sectional view on the line X—X of Fig. 1, looking in the direction of arrow 2; and Fig. 3 is a similar section on said line X—X, looking in the direction of arrow 3. Fig. 4 is an enlarged sectional plan view of the screw feed releasing mechanism, the section being taken on the line 4—4 of Fig. 3.

As shown in the drawings, end-plates 1 and 2 are united by fixed rods 3 and 4 to form a frame in which the grinding wheel and the driving and feeding mechanism therefor are carried as more fully hereinafter described. Said frame is hingedly supported as shown upon standards 5 and 5, having adjustable extensions 6 and 6 regulated by nuts 7 and 7, the heads 8 of which extensions are strung upon the rod 3. This entire frame may be swung upon its hinged supports to bring it into working relation with the mower, as hereinafter further described, or swung out of the way to permit the free placing or removing of the mower, in which latter position it may be retained, as by means of the set-screw 9.

Journaled in the end-plates 1 and 2 are a driving-shaft 15 and a screw-feed-shaft 16 lying between and parallel with the rods 3 and 4 as shown. To each of said shafts 15 and 16 outside the end-plate 1, are secured geared-wheels 17 and 18; and said plate 1 has a triangular extension forming a journal bearing 19 for a crank shaft 20. Upon said shaft 20 is secured a gear 21, meshing with both gears 17 and 18, to drive the shafts 15 and 16; and said shaft 20 may be rotated in any well known manner, preferably by a crank 22 as shown.

Slidably mounted on the rod 3, and shafts 15 and 16, as shown, are spaced grinder-frame-plates 25 and 26, which carry between them a gear wheel 27, feathered to the shaft 15, and an intermeshing gear 28 mounted upon a counter-shaft 29 journaled in said plates, the projecting end of said shaft 29 having secured thereto a grinder wheel 30 of suitable abrasive material. And between these plates 25 and 26, as shown, and in engagement with the thread of the screw-feed-shaft 16, is also mounted a nut to reciprocate said grinder-frame and the driven grinder wheel carried thereby along the shaft 15. This nut is preferably formed parted as shown more particularly in Fig. 4, so that the grinder-frame may be freed from the shaft 16 when desired either by hand or by an automatic release at the end of each reciprocating movement. Said parted nut consists, as shown, of two coöperating screw-threaded parts 40—40 slidably mounted in recesses 42 formed in the inner faces of the spaced-plates 25, 26, and each of said parts 40—40 are provided with studs 43 projecting through slotted openings 44 in said plates so as to permit a limited movement toward and from each other to engage or disengage with the threads of shaft 16. Upon the outside of the plates 25, 26, are rotatably mounted cam disks 45 having cam slots engaging the projected studs 43, and formed with lever extensions 46 connected by a spacing bar 47 to operate said disks jointly.

A turning movement of the disks 45 will move the nut parts 40—40 toward or away from the screw-shaft 16, and a spring 48 normally retains said parted nut in engagement with said shaft. A stop cam 49 adjustably mounted on the rod 3, as shown, and in the path of travel of the spacing bar 47, turns said disks 45 to free the nut from the shaft 16 when the grinder wheel 30 has reached one end of its reciprocated movement.

Upon one edge of the plate 25, as shown, is formed a boss 50 drilled to receive the upper end of a blade-engaging finger 51, the lower end of which is preferably bent at right angles and carries a roller 52 to ride upon a cutting blade of the mower and press the same against the grinder-wheel 30. This rod 51 is vertically and rotatably movable in said boss 50 and is retained in adjusted position as by a set-screw 53 as shown.

Properly spaced standards 60, adjustable in height, and having clamping heads 61 are preferably provided to independently secure and position the lawn mower in parallel relation with the grinder wheel frame.

A lawn mower indicated in dotted lines in the drawings, is shown in position for grinding the cutting blades. Any type of mower may be ground, and in the well known type shown, 70 represents the driving wheels, 71 the fixed spacing bar between said wheel frames, and 72 the cutting blades mounted in a driven spindle as usual. The mower is secured in the standard 60 by means of the clamping-heads 61 gripping the spacing bar 71 to elevate the wheels 70 and permit their rotation as required in turning the curved blade 72 to maintain it in contact with the grinder wheel 30. The carrying frame with its reciprocated grinder-wheel 30 is then swung upon its hinged support in the standards 5, 6, to properly position said grinder wheel to contact with and cut an edge on a cutting blade 72; and said frame is preferably held in such adjusted position by links connecting the frame rod 4 and mower bar 71. Each of these links consists of clamping ends 75, 76, secured respectively to the frame-rod 4 and mower-bar 71, and are adjustably spaced from each other by right-and-left threaded screws 77. The turning of said screws 77 elongates or shortens said links to properly swing said frame upon its hinged support and maintain it in such adjusted position. The rotation of the crank 22 turns the shafts 15 and 16 through the gear wheels 21, 17, and 18. Shaft 15 carries the feathered gear 27 and drives the grinder-wheel 30 through the gear 28. The parted nut 40—40, held in contact with the screw-feed-shaft 16, reciprocates the grinder-frame and its driven wheel 30 along the shaft 15. The blade-contacting-roller 52 of the finger 51 is adjusted to contact with and ride upon the under side of a blade 72 to maintain it in contact with the grinder wheel 30. And the cam stop 49 is set to separate the parted nut 40—40 when the wheel 30 reaches the end of the blade 72. Upon the completion of the grinding operation of one blade, another blade is brought into contact with the grinding wheel, by turning the cutting blade spindle, without disturbing the adjustments, so that each blade 71 will be equally ground, and the grinder wheel 30 is so set that it will grind each blade-edge at a proper angle to form a "clearance" or angular edge on said blade to facilitate proper cutting by the latter.

The machine as described is simple and compact and readily adjustable to suit mowers of varying make and size and the hinged frame carrying all the working parts permits of the ready setting or removal of the mower.

What I claim is:

1. In a lawn mower grinder, the combination with mower supporting standards, of an independently hinged frame carrying a grinding element and means for rotating and reciprocating the latter, and adjustable links pivotally clamped to the free end of said hinged frame and to said mower supports whereby said frame may be adjustably set relative to the mower.

2. In a lawn mower grinder, the combination with adjustable mower supporting standards adapted to be clamped to the spacing bar of the mower, of a rectangular grinder frame carrying a grinding element and means for rotating and reciprocating the latter, independent standards hingedly supporting said grinder frame, and adjustable links pivotally carried at the free end of said hinged frame and adapted to be clamped to the spacing bar of the mower whereby said frame may be adjustably set relative to the mower.

3. In a lawn mower grinder, the combination with mower supporting standards arranged to elevate and rotatably carry the cutting blades, of an independently supported hinged frame carrying a grinding element and means for rotating and reciprocating the latter, and a longitudinally and rotatably adjustable blade-contacting finger movable with said grinding element.

4. In a lawn mower grinder, the combination with mower supporting standards arranged to elevate and rotatably carry the cutting blades, of an independently supported hinged frame carrying a grinding element and means for rotating and reciprocating the latter, and a longitudinally and rotatably adjustable blade-contacting finger movable with said grinding element and having an angular end portion with a blade-contacting roller mounted therein.

5. In a lawn mower grinder, the combination with mower supporting standards, of an independently hinged frame swingingly adjustable in parallel relation with said mower, a drive-shaft and a parallel screw-feed-shaft journaled in said frame, shaft-driving means carried by said hinged frame, a grinder frame slidable on said shafts, a grinder wheel rotatably mounted in said grinder-frame and driven by a gear wheel feathered to said drive shaft, a parted-nut in said grinder-frame engaging said screw-feed-shaft, nut-releasing means carried by the grinder frame, and a stop device arranged to operate said releasing means.

6. In a lawn mower grinder, the combination with mower supporting standards, of an independently hinged frame swingingly adjustable in parallel relation with said mower, a drive-shaft and a parallel screw-feed-shaft journaled in said frame, shaft-driving means carried by said hinged frame, and a grinder mechanism comprising spaced plates slidable on said shaft, a rotatably-mounted grinder wheel, a feathered gear wheel and a parted nut mounted between said spaced plates, and means for engaging and disengaging said parted nut.

7. In a lawn mower grinder comprising a screw feed shaft and a grinding mechanism carried thereby, spaced grinder frame plates, a parted-nut slidably mounted therein, studs on said nut parts, a cam disk normally turned to engage said parted nut with the screw shaft, and a stop cam to turn said disk to free said nut parts from the shaft.

In testimony whereof I affix my signature in presence of two witnesses.

JOHN H. SCHLEGEL.

Witnesses:
CAMERON E. STRAUSS,
D. M. STEWART.

---

Copies of this patent may be obtained for five cents each, by addressing the "Commissioner of Patents, Washington, D. C."